W. V. TURNER.
BRAKE APPLICATION VALVE DEVICE.
APPLICATION FILED AUG. 22, 1918.
1,309,787.
Patented July 15, 1919.
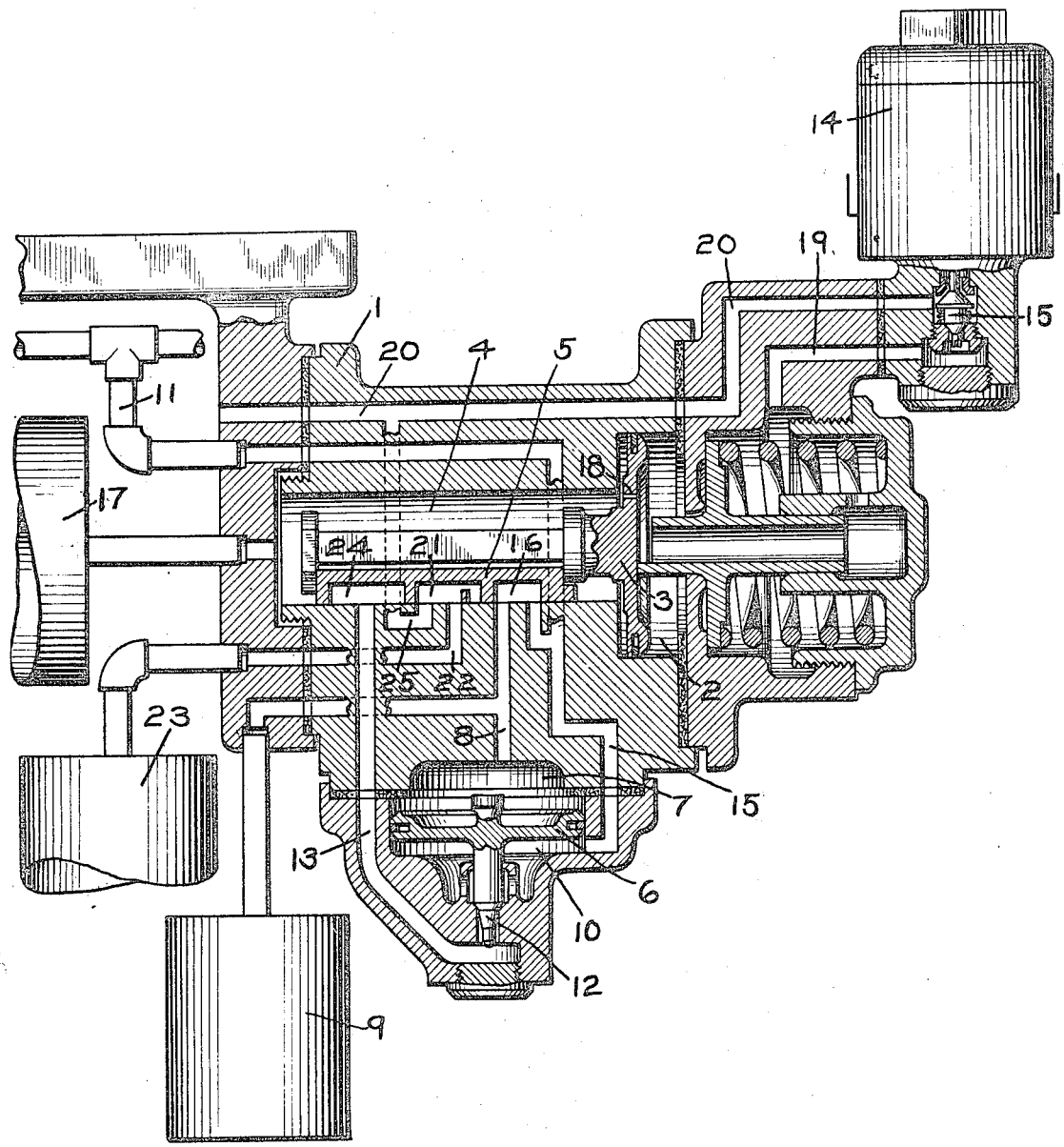
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO WESTINGHOUSE AIR BRAKE COMPANY, OF WILMERDING, PENNSYLVANIA, A CORPORATION OF PENNSYLVANIA.

BRAKE-APPLICATION-VALVE DEVICE.

1,309,787.     Specification of Letters Patent.    Patented July 15, 1919.

Application filed August 22, 1918. Serial No. 250,940.

*To all whom it may concern:*

Be it known that I, WALTER V. TURNER, a citizen of the United States, residing at Wilkinsburg, in the county of Allegheny and State of Pennsylvania, have invented new and useful Improvements in Brake-Application-Valve Devices, of which the following is a specification.

This invention relates to fluid pressure brakes, and more particularly to a brake application valve device adapted for automatic train control equipments.

In my prior Patent No. 1,255,956, dated February 12, 1918, there is disclosed a brake application valve device of the above character in which an equalizing discharge valve mechanism is employed for controlling the venting of fluid from the brake pipe, to effect an application of the brakes.

The principal object of my present invention is to provide means for cutting off the discharge port of the equalizing discharge valve mechanism when the application valve device is in normal release position, so that in case the equalizing piston should happen to be unseated when the brake system is being charged, fluid will not escape from the brake pipe to the atmosphere, by way of the discharge valve.

In the accompanying drawing, the single figure is a central sectional view of a brake application valve device embodying my improvement.

As shown in the drawing, the brake application valve device may comprise a casing 1, having a piston chamber 2, containing a piston 3, and a valve chamber 4, containing a slide valve 5, adapted to be operated by piston 3.

The casing 1 also has a piston chamber containing an equalizing piston 6, the chamber 7 on one side being connected by a passage 8 with an equalizing reservoir 9, and chamber 10 at the opposite side being connected by passage 15 to brake pipe 11.

The piston 6 operates a discharge valve 12, which controls the venting of fluid from the brake pipe 11 to a passage 13, leading to the seat of slide valve 5.

For controlling the operation of piston 3, a magnet 14 is provided, which is adapted to operate a valve 15, for venting fluid from piston chamber 2.

In operation, when the brake pipe 11 is charged with fluid under pressure, fluid flows from same, through passage 15 to chamber 10 of the equalizing discharge valve mechanism, and also from said passage through a cavity 16 in slide valve 5 to passage 8, charging the chamber 7 and also the equalizing reservoir 9 with fluid under pressure.

The valve chamber 4 is charged with fluid under pressure from a constant source of pressure, such as the main reservoir 17, and from valve chamber 4, fluid equalizes through a port 18 in piston 3, into piston chamber 2.

Normally, the magnet 14 is energized and holds the valve 15 closed, so that fluid cannot escape from piston chamber 2, through the passage 19.

If, for any reason, the equalizing piston 6 should not be seated while the system is being charged, fluid cannot escape from the brake pipe by way of the discharge valve, since according to my invention, the discharge passage 13 from the discharge valve 12 is cut off from the atmosphere by the slide valve 5, when the same is in normal release position, as shown in the drawing.

Upon deënergizing the magnet 14, the valve 15 is opened, so that fluid is vented from piston chamber 2 to exhaust passage 20. The piston 3 will then be operated by the higher pressure in valve chamber 4 and slide valve 5 will be shifted so as to connect passage 8, through cavity 21, with passage 22, which leads to a reduction reservoir 23.

Fluid is thereupon vented from chamber 7 and the equalizing reservoir 9 to the reduction reservoir 23, causing the higher brake pipe pressure in chamber 10 to shift the piston 6 and open the discharge valve 12. The movement of slide valve 5 also causes cavity 24 to connect passage 13 with a passage 25, leading to exhaust passage 20, so that fluid can now be freely vented from the brake pipe past the discharge valve 12 to the atmosphere.

It will now be evident that with the above described construction, loss of fluid from the brake pipe by way of the equalizing discharge valve mechanism is prevented during the charging of the brake system with fluid under pressure, while the normal operation of said mechanism is not interfered with, since the discharge passage is opened to the atmosphere when the application valve device is operated to effect a reduction in brake pipe pressure.

Having now described my invention, what I claim as new, and desire to secure by Letters Patent, is:—

1. In a fluid pressure brake, the combination with a brake application valve device and a brake pipe, of a discharge valve for venting fluid from the brake pipe, a piston controlled by said valve device for operating said valve, and means for normally preventing the venting of fluid from the brake pipe past the discharge valve.

2. In a fluid pressure brake, the combination with a brake application valve device and a brake pipe, of an equalizing reservoir, a brake pipe discharge valve, a piston subject to the opposing pressures of the brake pipe and the equalizing reservoir for operating said valve, and means controlled by said application valve device for venting fluid from the equalizing reservoir and for controlling the discharge port from said discharge valve.

3. In a fluid pressure brake, the combination with a brake pipe and equalizing reservoir, of a brake pipe discharge valve, a piston subject to the opposing pressures of the brake pipe and the equalizing reservoir for operating said valve, and a valve device for venting fluid from said equalizing reservoir and normally adapted to close the port through which the discharge valve vents fluid from the brake pipe.

4. In a fluid pressure brake, the combination with a brake pipe and equalizing reservoir, of a brake pipe discharge valve, a piston subject to the opposing pressures of the brake pipe and the equalizing reservoir for operating said valve, and a valve device having a normal position in which the discharge port from the discharge valve is closed and an application position in which fluid is vented from the equalizing reservoir and in which the discharge port is opened to the atmosphere.

In testimony whereof I have hereunto set my hand.

WALTER V. TURNER.